Feb. 25, 1930.    J. H. MILLER    1,748,847
RADIO TUBE TESTING INSTRUMENT
Original Filed April 2, 1925    2 Sheets-Sheet 1
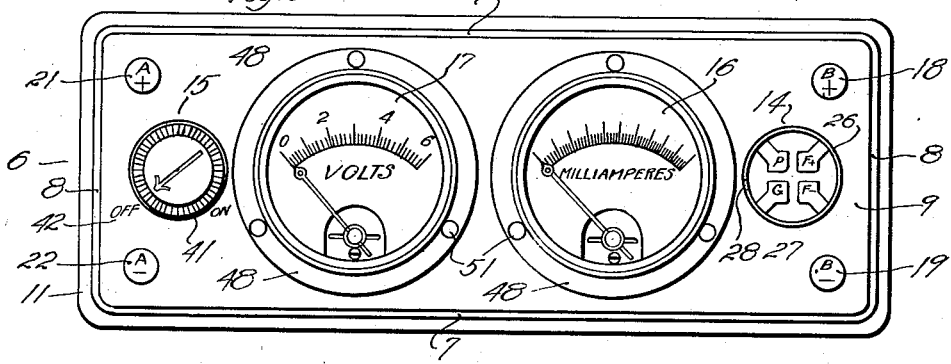
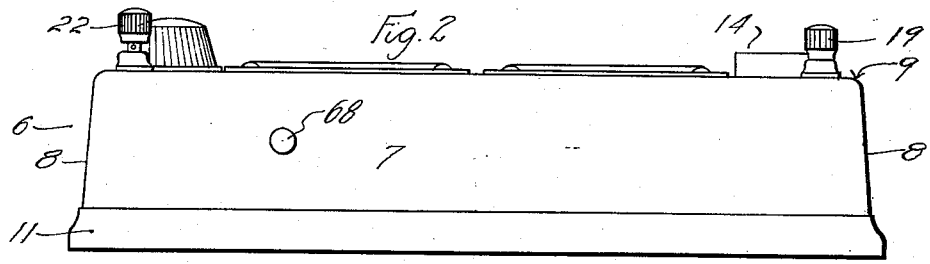
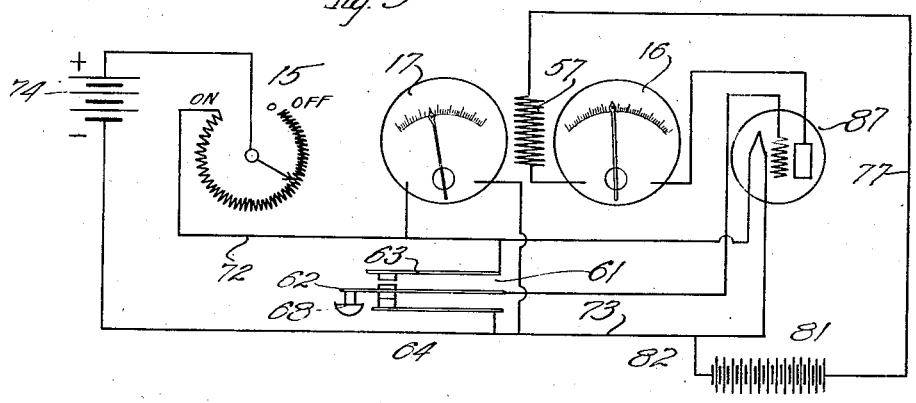
Inventor
John H. Miller
Williams, Bradbury,
McCaleb & Hinkle
Attys

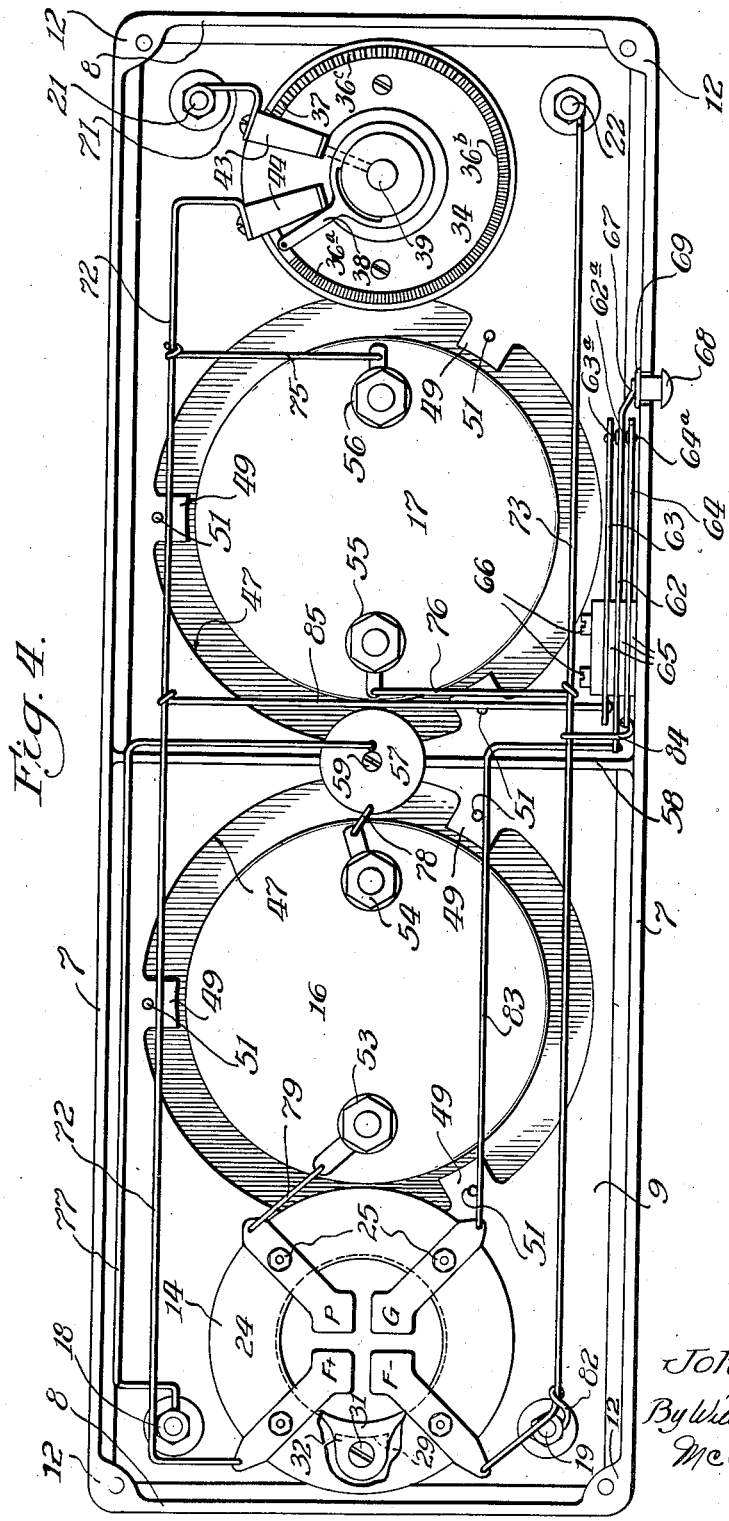

Patented Feb. 25, 1930

1,748,847

UNITED STATES PATENT OFFICE

JOHN H. MILLER, OF OAK PARK, ILLINOIS, ASSIGNOR TO JEWELL ELECTRICAL INSTRUMENT COMPANY, OF CHICAGO, ILLINOIS, A CORPORATION OF ILLINOIS

RADIO-TUBE-TESTING INSTRUMENT

Application filed April 2, 1925, Serial No. 20,080. Renewed October 2, 1928.

The present invention relates to radio tube testing instruments.

One of the objects of the invention is to provide an instrument for testing radio tubes which is capable of simple and expeditious operation; and which is of inexpensive construction so that the device can be sold for a comparatively low price. The testing instruments which have heretofore been provided have been comparatively expensive and involved in operation. There has arisen the need for a small and inexpensive instrument for the dealer whose business in radio accessories does not warrant the purchase of the more expensive instruments, or who must handle tubes in quantities with speed, and at a relatively small expense. The present instrument fulfills these requirements and provides a device which can be operated by one having no extensive knowledge of testing instruments or the testing of radio tubes.

A further object of the invention is to provide an instrument having selective switch means for quickly and easily changing the polarity of the voltage applied to the grid element of the tube. By the provision of this polarity changing switch, the conductance of the plate circuit of the tube can be readily tested with negative and positive potentials applied to the grid element.

Another object of the invention is the provision of a novel and simple method of testing thermionic tubes, which requires only a few instruments and which determines the mutual conductance of the tube with an accuracy sufficient to meet the needs of the dealer or user of tubes.

Referring to the accompanying drawings illustrating my invention:

Figure 1 is a top plan view of the assembled instrument;

Figure 2 is a front elevational view;

Figure 3 is a diagrammatic illustration of the circuits employed in the instrument; and Figure 4 is a bottom plan view of the instrument, with the lower base plate removed.

The various units of the instrument are all carried in a case 6 of oblong form having side and end walls 7 and 8 and a top wall 9. Access to the interior of the case is afforded through the open bottom of the same, which is normally closed by a base plate 11. Screws pass up through the corners of this base plate and tap into threaded bosses 12 formed in the corners of the case (Fig. 4).

Mounted in one end of the case is a socket 14 which may be of any conventional size either for tubes having the standard navy type base, or for other types of tubes having different styles of bases. The navy type base is represented in UV—200, UV—201—A and C—300 tubes; and the other types of bases are represented in C—199 and WD—12 tubes. A socket for the navy type of tube is preferable, as this is the most prevalent size of tube, the testing of other sizes of tubes being readily performed by the insertion of an appropriate adapter in the socket 14.

Mounted in the other end of the case is a rheostat 15 for controlling the filament circuit leading to the socket 14. As I shall hereinafter describe, this rheostat has a wide range of resistance gradation through the use of a sectionalized resistance element, this construction adapting the present rheostat to the proper control of 1.1-volt, 3-volt or 5-volt tubes.

Intermediate the socket 14 and rheostat 15 are two meters 16 and 17, the former for indicating the current flow through the plate circuit of the tube and the latter for indicating the voltage applied to the filament of the tube.

At the right-hand end of the case are mounted two B battery terminals 18 and 19, which are suitably insulated from the top wall 9 of the case. At the left-hand end of the case are mounted the two A battery terminals 21 and 22, which likewise are suitably insulated from the case. These binding posts are marked to indicate the polarities of their respective batteries and are preferably of the type having irremovable tops so that these tops cannot become lost.

Referring now to the details of construction of the various parts, and referring first to the construction of the socket 14, it will be observed from Figure 4 that this socket comprises a base ring 24 of insulating material, to which are secured the four contact springs F+, F− and P and G. These contact springs are secured to the insulating ring 24 by bolts or screws 25 and have their outer ends projecting from the periphery of the insulating ring for receiving the bus wires. The shell 26 of the socket extends up through an opening 27 in the top wall of the case and has the conventional bayonet slot 28 in its upper edge for receiving the registering pin on the tube. Depending from the top wall of the case at different points around the opening 27 are bosses 29, which are tapped at their lower ends for receiving screws 31 which pass through holes in the base ring 24. The lower end of the shell 26 has apertured ears 32 extending laterally therefrom, which engage between the base ring 24 and the threaded bosses 29, the screws 31 passing through these apertured ears and firmly clamping these ears between the rings 24 and the bosses 29.

The rheostat 15 comprises a base portion 34 which is secured to the top wall of the case by screws 35. The resistance element 36 is wound on a raised annular rib 37 of insulating material, which is suitably supported by the base 34. This resistance element is divided into three sections, $36_a$, $36_b$ and $36_c$. Each of these sections is of a gauge of resistance wire suitable to the control of 1.1-volt, 3-volt and 5-volt tubes, or such other tubes as may be tested. The adjoining ends of these sections are, of course, connected together in series. The wiper arm 38 is suitably connected to the shaft 39 of the rheostat for resiliently contacting with this composite resistance element 36, a marked knob or dial 41 being secured to the upper end of the shaft above the top of the case for rotating the wiper arm 38. Suitable indicia 42 on the top of the case indicate when the rheostat is off and on. The base portion 34 of the rheostat carries two terminals 43 and 44, the former connecting with the shaft 39 and wiper arm 38 through a conductor 45, and the latter being connected to the resistance element at the end of the high resistance section $36_a$.

The meters 16 and 17 are of any preferred design, these being conventional units which do not require any specific illustration or description. Both meters lie in openings 47 in the top wall of the case, being supported in these openings by their outer facing flanges 48 (Figure 1) which overlie the margins of the openings 47. Extending inwardly from the circular margins of each opening is a plurality of segmental portions 49 formed as integral parts of the top wall of the case. These segmental portions 49 are threaded for receiving screws 51 which pass down through the outer flanges 48 of the meters and thread into these top segmental portions. The terminals 53 and 54 for the milliammeter 16 and the terminals 55 and 56 for the voltmeter 17 both project from the rear sides of their respective meters in convenient position for receiving connecting lugs.

A bobbin 57 of resistance wire is supported on the central rib 58 of the case between the two meters 16 and 17. A screw 59 passes through this bobbin and taps into a threaded boss formed in the rib 58. This bobbin of resistance wire is connected in series with the milliammeter 16 to prevent excess current from injuring this meter, as I shall presently describe.

Supported on the inner side of the front wall 7 of the case is a polarity selecting switch 61 for controlling the polarity of the potential applied to the grid of the tube. This switch comprises three leaf springs 62, 63 and 64 which are spaced from each other and supported on the side wall of the case by insulating blocks 65. Screws 66 pass through these insulating blocks and leaf springs and tap into holes in the front wall of the case, the screws being, of course, insulated from the leaf springs. The free ends of the springs carry contacts $62_a$, $63_a$ and $64_a$, respectively. The intermediate spring 62 is the movable element of the switch, the three springs being so arranged that the contact $62_a$ of this intermediate spring normally engages the contact $64_a$ of the spring 64. The end of the spring 63 projects beyond the ends of the other two springs and has a deflected finger 67 which bears against the back of the push button 68 extending through an aperture in the front wall 7 of the case. The front end of this button has an enlarged head and the rear end of the button has a flange 69 secured thereto, so that the button is held against displacement in its aperture in the case.

I shall now describe the circuit connections for the various parts of the instrument, reference being had particularly to Figures 3 and 4. The A+ binding post 21 connects through a bus wire conductor 71 with the terminal 43 of the rheostat 15. As before described, the circuit from this terminal 43 is through the shaft 39, wiper arm 38 and resistance element 36 back to the other terminal 44. From this terminal 44 a bus bar conductor 72 extends to the other end of the instrument and connects to the F+ contact spring of the socket 14, being suitably soldered to the projecting lug end of this contact spring. The filament current flow is thence up through the filament winding of the tube, as indicated in Figure 3, and back to the contact spring F− of the socket. From the outer end of this contact spring a bus bar 73 extends to the other end of the instrument and makes connection with the A− binding post 22.

This circuit, when completed through the external A battery conventionally represented at 74 in Figure 3, constitutes the filament circuit of the tube. The intensity of illumination of the filament is governed by the setting of the rheostat 15, this rheostat serving properly to graduate the voltages for 1.1-volt, 3-volt and 5-volt tubes, as heretofore described. Placed in shunt of this filament circuit is the voltmeter 17. A conductor 75 connects the terminal post 56 of voltmeter 17 with the long bus bar 72 which represents the positive side of the filament circuit. A conductor 76 connects the other terminal post 55 of the voltmeter to the long bus bar 73, corresponding to the negative side of the filament circuit. This voltmeter will indicate at all times the effective potential being applied to the filament of the tube, and will thereby indicate substantially what the emissive action of the filament should be.

The plate circuit of the tube and of the instrument is traced from the B+ binding post 18 through a bus bar 77 to one end of the protective resistance winding 57. The other end of this resistance winding 57 is connected through the short conductor 78 with the terminal post 54 of the milliammeter 16. The other post 53 of the milliammeter connects through conductor 79 with the contact spring P of the tube socket 14. This places the positive potential of the B battery, diagrammatically represented at 81 in Figure 3, on the plate element of the tube. The other side of this plate circuit extends from the negative side of the tube filament down through the contact spring F— of the socket to the bus bar 73. A conductor 82 is soldered to this bus bar and makes connection with the B— binding post 19.

It will be noted that all current flowing through the plate circuit above traced will be indicated in milliamperes on the meter 16. It is the relation of this current flow through the plate circuit relative to the intensity of the filament illumination and the polarity which is applied to the grid that determines the condition of the tube.

The grid contact spring G of the tube socket connects through a bus bar 83 to the central contact spring 62 of the polarity changing switch 61. The front contact spring 64 is connected to the negative side of the A battery or filament circuit through a short conductor 84 which is soldered to the end of the contact spring and to the bus bar 73. The rear contact spring 63 is connected to the positive side of the A battery or filament circuit through the bus bar 85 which is soldered to the end of the contact spring and to the bus bar 72. As will be readily apparent from Figure 3, the position of the central contact spring 62 determines the polarity of the grid element of the tube 87. Normally this contact spring 62 engages with the front contact spring 64 so that the negative potential of the A battery, effective on the bus bar 73, is transmitted to the grid element of the tube. One or more readings is made from the meter 16 with the grid element having this negative potential or bias. Thence, the button 68 is depressed to place the central contact spring in engagement with the rear contact spring 63 which places the positive potential or bias of the A battery on the grid element. Thereupon one or more additional readings is taken on the milliammeter for testing the tube with this positive potential or bias applied to the grid element. The shifting of the grid from the negative to the positive filament terminal of the tube should give a higher reading on the milliammeter 16, the proportion of change indicating the mutual conductance of the tube and being an important factor in determining the condition of the tube. As before stated, this shifting of the grid connection from the negative to the positive terminal of the tube is performed by the mere pressing of the button 68, from which it will be obvious that the two different sets of readings can be made easily and quickly.

I do not intend to be limited to the particular details herein shown and described, except as they are defined in the appended claims.

I claim:

1. In a radio tube testing instrument, the combination of a case comprising side, end and top walls, a socket mounted in said top wall adjacent one end of the case, a rheostat mounted on said top wall adjacent the other end of said case, a voltmeter and a milliammeter mounted in said top wall between said socket and said rheostat, a pair of filament current binding posts mounted on said case and connected in circuit through said rheostat to the filament terminals of said socket, a pair of plate circuit battery binding posts mounted on said case and connected in circuit with the plate terminal and one of the filament terminals of said socket, said voltmeter being connected in shunt of said filament terminals, said milliammeter being connected in series in the circuit through said plate circuit battery binding posts, and a grid potential selecting switch comprising three leaf spring contacts supported inside said case, the central spring contact being connected to the grid terminal of said socket, the outer spring contacts being connected to the filament terminals of said socket, and a push button extending through an opening in said case for actuating said central spring contact.

2. In a radio tube testing instrument, the combination of a case having side, end and top walls, a socket carried by said case, a meter carried by said case for indicating the condition of the tube undergoing test in said socket, the top wall of said case having an opening therein receiving said meter, lugs projecting inwardly from the periphery of said opening, a flange on said meter overlying the edges of said opening, and screws passing through apertures in said flange and threading into tapped holes in said lugs.

3. In a unitary testing instrument for thermionic tubes, a casing comprising a base member and an instrument supporting cover, said cover supporting and enclosing a standard socket for thermionic tubes, a rheostat of graduated resistance for testing tubes of different characteristics, a milliammeter for measuring plate current, a voltmeter for measuring filament and grid voltage, a switch for impressing positive and negative voltage upon a grid, and electrical connectors for connecting the same to sources of electromotive force.

4. In a radio tube testing instrument, means for connecting the terminals of a tube with said instrument, means for connecting an electromotive force of predetermined value to the filament of said tube, means for connecting said electromotive force to the grid, means for connecting said electromotive force in reversed polarity to the grid, and means for measuring the resulting change in plate current.

5. The method of testing an electron tube having grid, plate and filament electrodes, comprising, applying an electromotive force to the plate electrode, applying an electromotive force of predetermined value to the filament electrode, connecting said electromotive force of predetermined value to the grid, changing the polarity of said electromotive force with respect to the grid, and measuring the resulting change in plate current to determine the worth of a tube.

6. In a thermionic tube tester, the combination of a source of electromotive force, with filament circuit conductors for connecting said source to a filament, a pair of switch contacts and conductors for connecting each of said contacts to one of said filament circuit conductors, another conductor for connecting said source to an electrode of said tube to form an electrode circuit, a movable switch member cooperating with said contacts, a conductor for connecting said switch member to another electrode of said tube to form another electrode circuit, and means for indicating a change of current in one of said electrode circuits when said switch engages one or the other of said contacts to measure the worth of a tube.

7. A testing device for thermionic tubes, having a filament and other electrodes, comprising a support having a vacuum tube socket and contacts, means for connecting the filament contacts of said socket to an electromotive force for energizing the filament, means for indicating the measure of electromotive force applied to said filament, means for connecting the plate contact of said socket to a supply circuit, means for indicating current flow in the plate circuit, a movable switch member, means for connecting said movable switch member to the grid contact of said socket, other switch members connected to each side of said filament, means for urging said movable switch member into engagement with the first of said other switch members, and a push button for moving said movable switch member into engagement with the second of said other switch members, said current indicating means being adapted to indicate the changed current flow in said plate circuit for determining the worth of a tube.

8. A thermionic tube tester comprising a source of electromotive force, circuit elements extending from opposite terminals of said source to the plate and filament of a tube to form a plate energizing circuit, a filament circuit including means energized by a source of electromotive force for impressing an appropriate voltage across the tube filament terminals, and means for alternatively connecting the grid to two spaced points in one of said circuits, whereby different bias voltages may be impressed on the grid of said tube.

9. The method of testing thermionic tubes which comprises energizing the plate, filament and grid circuits of the thermionic tube, switching said grid from one point in one of said circuits to another spaced point of different potential in said circuit to change the bias of said grid, and indicating the resulting change in plate current.

10. The method of testing thermionic tubes which comprises energizing the plate, filament and grid circuits of the thermionic tube, said grid being given an initial predetermined negative bias to reduce the plate current, switching said grid from the point in one of said circuits from which said negative bias is derived to another spaced point of different potential in said circuit to change the bias of said grid, and indicating the resulting change in plate current to determine the worth of the tube.

In witness whereof, I hereunto subscribe my name this 24th day of March, 1925.

JOHN H. MILLER.